May 8, 1956
G. J. ZINGGELER
2,744,281
CELLULOSIC SPONGE CLEANING IMPLEMENT
Filed Feb. 12, 1952
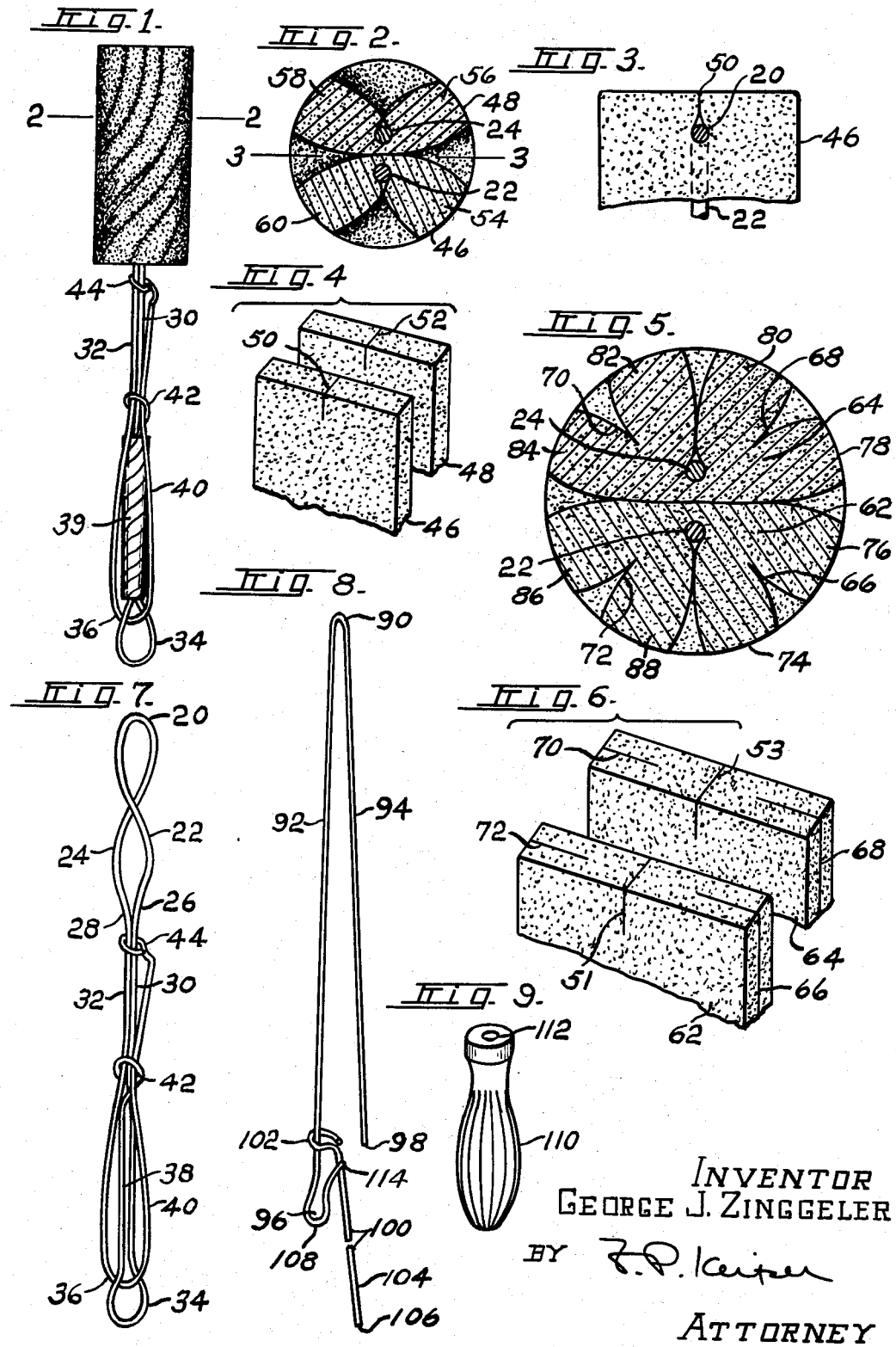
INVENTOR
GEORGE J. ZINGGELER
BY
ATTORNEY

United States Patent Office 2,744,281
Patented May 8, 1956

2,744,281

CELLULOSIC SPONGE CLEANING IMPLEMENT

George J. Zinggeler, Rochester, N. Y.

Application February 12, 1952, Serial No. 271,228

2 Claims. (Cl. 15—244)

This invention relates to appliances in the form of support frames or handles for manufactured cellulose sponges.

Manufactured cellulosic sponges presently on the market in block forms, are particularly adapted for use in scrubbing and cleaning operations. The present invention is directed to a support frame for conveniently holding such cellulosic sponges, the frame affording a convenient handle, as well as a holder for the cellulosic sponge, the holding feature being adapted to react upon the sponge to cause the same to assume a highly desirable shape for cleaning purposes. By highly compressing a cellulosic sponge in a frame along median lines, the cellulosic sponge is caused to take a shape readily adapted for projection into cavities and hollow spaces, and the effect produced may be generally enhanced by suitably slitting the cellulosic sponge to increase the number and area of cleaning and absorbing surfaces.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevational view of the appliance;

Figure 2 is a sectional view taken on the line 2—2 of Figure 1;

Figure 3 is a fragmentary sectional view taken on the line 3—3 of Figure 2;

Figure 4 is a perspective fragmentary view of the cellulosic sponge blocks in a dry, relaxed state utilized in Figures 1–3;

Figure 5 is an enlarged sectional view illustrating the effect of slitting the edges of the blocks before assembly;

Figure 6 is a perspective fragmentary view of the cellulosic sponge blocks in dry or relaxed state, slitted to provide the effect illustrated in Figure 5;

Figure 7 is an elevational view of the wire handle or frame utilized in Figure 1;

Figure 8 is a modified wire frame; and

Figure 9 is a handle adapted for application to the modification of Figure 8.

Referring to Figures 1, 2, and 7, the wire frame and handle structure is composed of a single length of wire of relatively stiff characteristics, such length being bent to form a narrow U as at 20, with extending legs 22 and 24, extending initially parallel, but closely and uniformly spaced. The legs 22 and 24 are offset slightly as at 26 and 28 to reduce the spacing and permit the portions 30 and 32 to extend along side by side. Each of the legs may have end loops 34 and 36 formed to provide reversely extending end portions 38 and 40, the end portion 38 being adapted to terminate in a tight transverse eye 42, while the end portion 40 extends further toward the U 20 and terminates in a tight eye 44, adjacent the offsets 26 and 28. Through such a structure, the initially parallel portions 22 and 24, extending from the loop 20 to the offsets 26 and 28, are held at either end from spreading, by the U 20 at one end, and the eye 44 at the other.

Prior to forming either eye 44 and 42 in tight embrace about the adjacent wire group, the parallel portions 22 and 24 are spread slightly to permit the insertion of a cellulosic sponge block or blocks 46 and 48, such as are indicated in Figure 4. Such blocks are slit slightly at one end as at 50 and 52 to receive the U end 20 in a recessed manner as is indicated in Figure 3. The slits are preferably effected while the blocks are dry and rigid, a well-known characteristic of artificial cellulosic sponges.

The cellulosic sponge blocks are then wet to render them soft and compressible, and thereafter the cellulosic sponges are inserted between the wire sections 22 and 24. The length of the sponge blocks is such as to extend substantially from the U 20 to the offsets 26 and 28, and the spacing of the wire sections 22 and 24 is such as to compress the sponge blocks along their medians to about a fifth or less of the normal thickness of the cellulosic sponge. The cellulosic sponge blocks, as thus held between the sections 22 and 24, take the form shown in Figure 2, exhibiting spaced lengthwise extending lobe-like portions 54, 56, 58 and 60. The parallel sections 22 and 24, after insertion of the cellulosic sponges therebetween, are held together by forming the eyes 42 and 44 around the handle portion of the wire, so as to provide a rigid, permanent construction. The parallel sections 22 and 24 may be given approximately a half twist as is shown in Figure 7, after the eyes 42 and 44 have been formed, to give the helical effect illustrated in Figure 1. The spacing between the sections 22 and 24 will be substantially uniform from the U 20 to the offsets 26 and 28 after such twist is effected.

The cellulose sponge blocks, when of larger size as shown in Figures 5 and 6, may be additionally slit lengthwise along their opposite longitudinal edges. The blocks 62 and 64 are thus slit as at 66, 68, 70, and 72, in addition to the slits 51 and 53. When such blocks are held between the uniformly spaced sections 22 and 24, the slit portions form substantially uniformly spaced lengthwise extending lobe-like portions 74, 76, 78, 80, 82, 84, 86 and 88.

An alternative form of holder structure is shown in Figures 8 and 9. As shown, a length of stiff wire is formed with a U 90, with leg portions 92 and 94, the leg portion 92 terminating in a hook-like portion 96, while the portion 94 terminates as at 98 somewhat short of the end. A slidable locking member 100 having an eye 102 formed of stiff wire is adapted to be slid up both leg portions 92 and 94, after a cellulosic sponge is placed therebetween, in the manner described in the other form. The eye is positioned immediately adjacent the lower end of the cellulose sponge or sponges, and the straight portion 104 is of such length that with the eye 102 positioned below a cellulosic sponge held between the eye and the end U, the end 106 will be even with the loop 108 of the hook 96. The handle 110 with its aperture socket 112 may thereafter be forced over the hook 96 and straight portion 104, the loop 108 and end 106 bottoming in the bottom end of the socket 112. The edge 114 will dig into the aperture wall and tend to secure the parts in assembled relation.

It will appear that the cellulose sponge blocks may be arranged in pairs, or a single block of double thickness utilized. As many slits, such as 66—72, may be provided to secure the desired number of lobes, and whether a single block or a double block be used, the effect of a pair of blocks can be obtained by slits formed in a block of double thickness where the dividing plane between a pair of blocks would be. In practice, such blocks will preferably be slit while dry and rigid, and thereafter assembled in the wire frame while wet, in which state the cellulosic sponge material is extremely soft and resilient. The compression of the blocks along the medians thereof, however, to the high degree set forth, whether in a holder of the type set forth or otherwise, produces the rosette-sectioned effect shown.

If desired, the loop 34 may be utilized for hanging the assembly on a hook, or made large enough to permit a finger to extend therethrough to provide a sure grip. In order to improve the handle, as well as the appearance, a plastic spiral 39, colored if desired, may be wrapped around the sections 38 and 40 intermediate the loop 34 and the eye 42. Such forms as are illustrated may be made in varying sizes and forms, to suit conditions as desired. With the U buried in the slits 50 and 52, protection is afforded against metal contact in utilizing the appliance on surfaces that might be injured by metal contact. The form shown is particularly adapted for container cleaning or projecting into hollow spaces, and the plurality of lobes formed by utilizing pairs, or slitting the blocks, serves to increase the exposed absorbent surface of the cellulosic sponge to enhance its cleaning effectiveness.

Although several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A cellulosic sponge cleaning implement comprising, in combination, a wire frame composed of a single relatively stiff section of wire having a sharp U-bend, and coextensive legs substantially uniformly spaced extending from said bend, tie means embracing said legs at a point remote from said U-bend for retaining said legs from spreading and maintaining such uniform spacing, said legs extending beyond said tie means and forming at least in part a handle, and cellulosic sponge material of normally rectangular block form and having a normal relaxed thickness between opposed faces many times the spacing between said legs between said U-bend and tie means, said sponge being secured between said legs, said U-bend and said tie means, the relaxed lengthwise-dimension of said cellulosic sponge being substantially the distance between said U-bend and tie means, and said legs extending along opposite grooves wholly formed by compression of said cellulosic sponge along lengthwise medians of the opposite faces of said cellulosic sponge material, said sponge material being divided into two parts along a plane, lying, when said material is relaxed, midway between and parallel with said opposite faces, whereby any transverse section through said material and legs exhibits symmetry with respect to an axis passing through the centers of both legs, and an axis transverse thereto passing between said legs, said divided parts being further subdivided, when said material is relaxed, by longitudinal slits extending parallel with said faces and midway between the outer face of each part and said other face.

2. A cellulosic sponge cleaning implement comprising, in combination, a wire frame composed of a single relatively stiff section of wire having a sharp U-bend, and coextensive legs substantially uniformly spaced extending from said bend, tie means embracing said legs at a point remote from said U-bend for retaining said legs from spreading and maintaining such uniform spacing, said legs extending beyond said tie means and forming at least in part a handle, and cellulosic sponge material of normally rectangular block form and having a normal relaxed thickness between opposed faces many times the spacing between said legs between said U-bend and tie means, said sponge being secured between said legs, said U-bend and said tie means, the relaxed lengthwise dimension of said cellulosic sponge being substantially the distance between said U-bend and tie means, and said legs extending along opposite grooves wholly formed by compression of said cellulosic sponge along lengthwise medians of the opposite faces of said cellulosic sponge material, said sponge material being divided into two parts along a plane, lying, when said material is relaxed, midway between and parallel with said opposite faces, whereby any transverse section through said material and legs exhibits symmetry with respect to an axis passing through the centers of both legs, and an axis transverse thereto passing between said legs, said leg wires between the U-bend and tie means being helically twisted, and said divided parts being further subdivided, when said material is relaxed, by longitudinal slits extending parallel with said faces and midway between the outer face of each part and said other face.

References Cited in the file of this patent

UNITED STATES PATENTS

| | | |
|---|---|---|
| 336,746 | Reisor | Feb. 23, 1886 |
| 1,433,326 | Wolfe | Oct. 24, 1922 |
| 1,466,506 | Haass | Aug. 28, 1923 |
| 2,138,712 | Saffert | Nov. 29, 1938 |
| 2,242,154 | Tomkin | May 13, 1941 |
| 2,290,216 | Steinmetz et al. | July 21, 1942 |
| 2,603,921 | Peterson | July 22, 1952 |
| 2,682,073 | Hoffman | June 29, 1954 |

FOREIGN PATENTS

| | | |
|---|---|---|
| 166,516 | Germany | Aug. 10, 1950 |
| 503,279 | Belgium | June 15, 1951 |